US008462650B2

(12) United States Patent
Qiang et al.

(10) Patent No.: US 8,462,650 B2
(45) Date of Patent: Jun. 11, 2013

(54) METHODS FOR SUPPORTING RAPID NETWORK TOPOLOGY CHANGES WITH LOW OVERHEAD COSTS AND DEVICES OF THE SAME

(75) Inventors: Gang Qiang, Shanghai (CN); Yang Zhang, Xi'an (CN); Quan Chen, Xi'an (CN); Xiao Ming Lan, Xi'an (CN); Peng Li, Xi'an (CN)

(73) Assignee: Skyphy Networks Limited, Grand Cayman (KY)

( * ) Notice: Subject to any disclaimer, the term of this patent is extended or adjusted under 35 U.S.C. 154(b) by 908 days.

(21) Appl. No.: 12/581,113

(22) Filed: Oct. 16, 2009

(65) Prior Publication Data

US 2010/0165880 A1 Jul. 1, 2010

Related U.S. Application Data

(60) Provisional application No. 61/106,272, filed on Oct. 17, 2008.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ............................ 370/252; 370/328; 370/389

(58) Field of Classification Search
None
See application file for complete search history.

(56) References Cited

U.S. PATENT DOCUMENTS

| 2004/0170130 | A1 | 9/2004 | Mehra | |
|---|---|---|---|---|
| 2007/0002736 | A1* | 1/2007 | Gade et al. | 370/230 |
| 2007/0127503 | A1 | 6/2007 | Zhao | |
| 2008/0186907 | A1* | 8/2008 | Yagyuu et al. | 370/328 |
| 2009/0161578 | A1* | 6/2009 | Yeung et al. | 370/254 |
| 2009/0196194 | A1* | 8/2009 | Paloheimo et al. | 370/252 |
| 2009/0196227 | A1* | 8/2009 | Bahr | 370/328 |

FOREIGN PATENT DOCUMENTS

| CN | 101005422 A | 7/2007 |
|---|---|---|
| CN | 101102272 A | 1/2008 |
| CN | 101159689 A | 4/2008 |
| WO | WO-2008055539 | 5/2008 |

OTHER PUBLICATIONS

PCT, The International Search Report and The Written Opinion of the International Searching Authority, Jul. 30, 2009.

* cited by examiner

*Primary Examiner* — Jae Y Lee
(74) *Attorney, Agent, or Firm* — Eastwind Consultants Co., Ltd.; Jenny Chen

(57) ABSTRACT

The present invention discloses a wireless communication method of supporting rapid changes in network topology. The present method may include broadcasting the first protocol message using the first broadcast cycle, the first protocol message being used for establishing a routing information between a node and destination node; and broadcasting the second protocol message using the second broadcast cycle, the second protocol message being used for establishing a link information between the node and a neighbor node, wherein the first broadcast cycle is different from the second broadcast cycle, and the first broadcast cycle is dynamically adjusted depending on a corresponding a detailed message contained in a plurality of segments in the first protocol message so as to reduce a number of broadcast of the first protocol message.

18 Claims, 8 Drawing Sheets

METHODS FOR SUPPORTING RAPID NETWORK TOPOLOGY CHANGES WITH LOW OVERHEAD COSTS AND DEVICES OF THE SAME

CROSS-REFERENCE TO RELATED APPLICATIONS

This application is related to and claims priority to U.S. provisional patent application, U.S. Provisional Application No. 61/106,272, filed on Oct. 17, 2008, by the applicants Gang Qiang, Yang Zhang, Quan Chen, Xiao Ming Lan, and Peng Li, entitled "Methods for supporting rapid network topology changes with low overhead costs and devices of the same."

FIELD OF THE INVENTION

The present invention relates to communication methods; more particularly, the present invention relates to methods for supporting rapid network topology changes with low overhead costs and devices of the same.

BACKGROUND OF THE INVENTION

As telecommunication technologies evolve, the mobility of terminal devices has been enhanced greatly. Multi-hop networks have also been deployed more widely. In the multi-hop network, the mobility of terminal devices can be fairly ad hoc. The terminal devices can move freely within one network or between different networks. Additionally, the terminal devices can be turned on or off randomly. Due to these rapid changes that may happen randomly in the multi-hop network, as well as the changes caused by the torrential difference and the interference among wireless channels, the topology structure of the multi-hop network may change accordingly. Unfortunately, such structural change cannot be predicted. Thus, it is difficult for the conventional network routing protocols to reflect the changing topology in real time. Furthermore, the control signals sent in the network for maintaining the topology can cause excessive transmission overhead, wasting a great portion of the network bandwidth, and consequently degrading network performance.

In the multi-hop network, most conventional routing protocols adopt the Distributed Bellman Ford (DBF) algorithm or link state (LS) routing to route data within the network. Due to the distributed nature of the DBF, it is simple to deploy and can effectively compute the single-source shortest paths in the network. However, slow convergence and a tendency to create routing loops make the DBF not suitable for the type of network having rapid topology changes. Although some solutions have been utilized to resolve the routing loop problem, the slow convergence of the DBF remains a problem in the art.

Some adopt the link state routing protocol to solve the slow convergence problem of the DBF. In the link state protocol, every node in the network constructs a map of the connectivity of the network in the form of a graph showing which nodes are connected with other nodes; as a result, the looping problem can be easily avoided. Additionally, since any changes in the links will trigger real time updates, it takes less time to converge new topology than the DBF does. However, the link state protocol requires each switching node in the network to send its information about its neighbors to the entire network, and thus results in high overhead, especially in the network where frequent changes occur. Massive update messages occupy a great portion of the valuable bandwidth, degrading the network performance.

Therefore, what is needed is wireless communication a method for supporting rapid network topology changes with low overhead costs and devices of the same.

SUMMARY OF THE INVENTION

In light of the drawbacks of the above prior arts, one object of the present invention is to provide a wireless communication method utilizing a protocol message, such as a beacon, to reflect real time adaptive topology changes with low overhead costs.

In accordance with the present invention, the wireless communication method for supporting rapid network topology changes may include broadcasting a first protocol message using a first broadcast cycle, the first protocol message being used for establishing a routing information between a node and a destination node; and broadcasting a second protocol message using a second broadcast cycle, the second protocol message being used for establishing a link information between the node and a neighbor node, wherein the first broadcast cycle is different from the second broadcast cycle, and the first broadcast cycle is dynamically adjusted depending on a corresponding detailed message contained in a plurality of segments in the first protocol message so as to reduce a number of broadcast of the first protocol message.

Another object of the present invention is to provide a wireless communication device utilizing a protocol message, such as a beacon, to reflect real time adaptive topology changes with low overhead costs.

In accordance with the present invention, the wireless communication device for supporting rapid network topology changes may perform the present method for supporting rapid network topology changes. The present method may include broadcasting a first protocol message using a first broadcast cycle, the first protocol message being used for establishing a routing information between a node and a destination node; and broadcasting a second protocol message using a second broadcast cycle, the second protocol message being used for establishing a link information between the node and a neighbor node, wherein the first broadcast cycle is different from the second broadcast cycle, and the first broadcast cycle is dynamically adjusted depending on a corresponding detailed message contained in a plurality of segments in the first protocol message so as to reduce a number of broadcast of the first protocol message.

In particular, the present invention may dynamically adjust a broadcast cycle of the protocol message based on the detailed message contained in the protocol message, such as a height beacon or a neighbor beacon, thereby reflecting real time adaptive network topology changes and lowering network transmission overhead costs.

Certain embodiments of the invention have other aspects in addition to or in place of those mentioned above. The aspects will become apparent to those skilled in the art from reading of the following detailed description when taken with reference to the accompanying drawings.

DETAILED DESCRIPTION OF THE INVENTION

The following embodiments are described in sufficient detail to enable those skilled in the art to make and use the invention. It is to be understood that other embodiments would be evident based on the present disclosure, and that changes may be made without departing from the scope of the present invention.

The present invention provides a wireless communication method for supporting rapid topology changes with low overhead costs. In particular, the present invention provides a wireless communication method that may dynamically adjust a broadcast cycle of a protocol message depending on a detailed message contained therein so as to reduce unnecessary broadcast, thereby reducing the transmission overhead costs.

Figure 1:
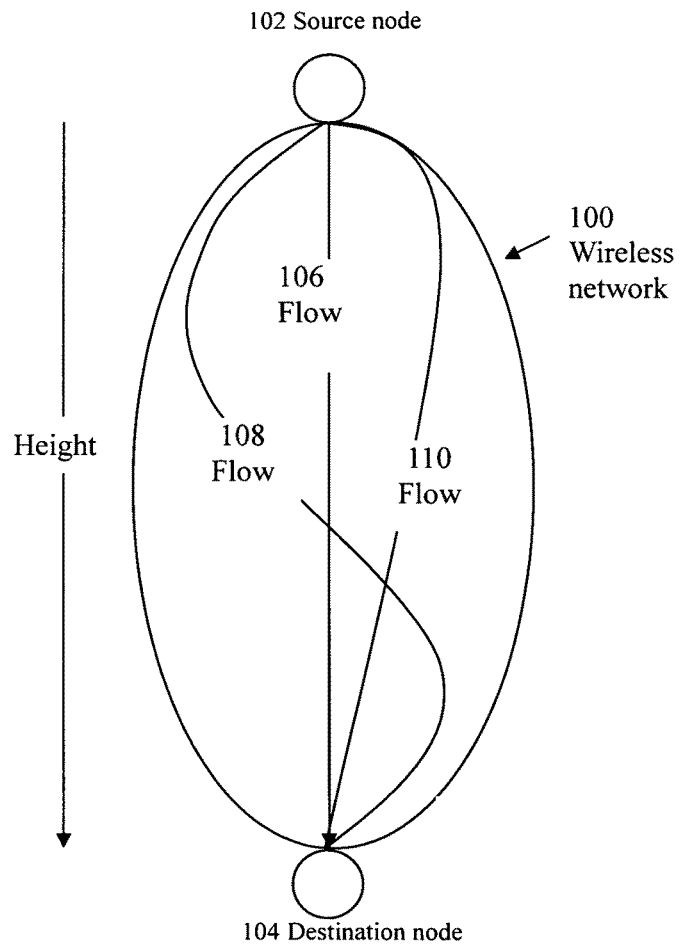
FIG. 1 is a schematic view of a height-based routing utilized in accordance with the present invention.

In one embodiment of the present invention, the present method may utilize a height-based routing protocol. Refer to FIG. 1, which illustrates a schematic view of the concept of the height-based routing protocol utilized in accordance with the present invention. The height-based routing protocol of the present invention is also called a destination-oriented routing protocol. That is, the height-based routing protocol focuses on keeping the data transmission moving towards the destination, instead of looking for the shortest route to the destination.

According to the present invention, a source node, such as source node 102, may wish to send data to a destination node, such as destination node 104, in a wireless network, such as wireless network 100. As shown in FIG. 1, there may be numerous network flows or paths between the source node 102 and the destination node 104, such as flows 106, 108 and 110.

In accordance with the height-based routing protocol utilized in the present invention, the source node 102 may not look for the shortest route between the source node 102 and the destination node 104, such as flow 106; instead, the source node 102 may establish a height that corresponds to a distance of a node from the destination so that data may be continuously transferred toward the destination. In one embodiment of the present invention, the height may change dynamically depending on the location of the node in relation to the destination, but it is always pointing to the particular destination, such as destination node 104.

An analogy of the height-based routing protocol may be given with an example of a stream flowing from the mountaintop to the bottom of the mountain. The mountaintop may be seen as a source, while the bottom of the mountain may be seen as a destination. The slope between any given point in the mountain and the bottom of the mountain may be seen as the height. As long as the stream follows the direction of the slope, it will reach the bottom of the mountain eventually. The important thing is not to decide the shortest path the stream should take to flow to the bottom, but to maintain a constant flow moving towards it. Since the stream does not stop flowing at the top when changes are made to the paths on the bottom of the mountain, the changes at the bottom of the mountain are irrelevant to the stream flow on the top of the mountain.

In other words, in the wireless network 100, when the data to be transmitted to the destination node 104 is at a relatively higher level of the height, that is, closer to the source node 102, topology changes closer to the destination node 104 will not influence the current flow at the particular higher level as long as the data continues to flow downwards to the destination node 104. Therefore, the purpose of establishing a height in accordance with the present invention is not to establish a route between the source and the destination, but to provide a direction for the route such that the data may be continuously transferred towards the destination.

As mentioned above, because the height may change dynamically depending on the position of the node in relation to the destination, it may be necessary to maintain a record of the different heights available for selection. Such record may be in the form of a height table. Consequently, the record of the heights selected for data transmission becomes a route table.

In accordance with the height-based routing protocol of the present invention, a local route table is used for sending and receiving data on the network. In accordance with the present invention, the data that is transferred through a link between a node and its neighbor node (NBR) may not need to rely on the height. Therefore, in order to implement a local routing, a rapid testing may need to take place between the neighbor nodes so as to discover the changes in the links in real time.

In particular, in accordance with one embodiment of the present invention, to send out data, a neighbor routing table may need to be looked up first so as to send the data directly through local routing. If there is no corresponding destination, then the data is sent according to the routes maintained in the route table.

Figure 2:
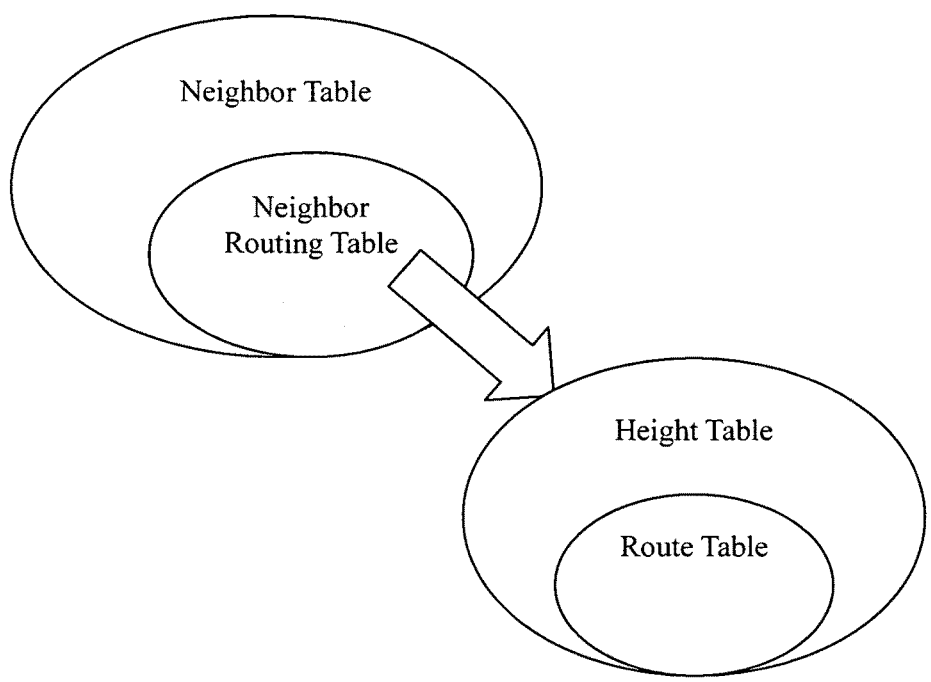
FIG. 2 is a drawing showing the relationship between a neighbor table and a route table in accordance with the present invention.

FIG. 2 shows the relationship between the height table and the neighbor table in accordance with the present system. As shown in FIG. 2, a neighbor table may include all information about the neighbors, and a portion of which becomes a neighbor routing table. On the other hand, a height table may include all information about the heights, and a portion of which becomes a route table.

In accordance with the present invention, two types of information may be maintained within a node. They are link status information between a node and its neighbor and routing information between the node and its destination. In one embodiment of the present invention, the routing information between the node and its destination may be established based on the link status information between the node and its neighbors. When the number of hops to the destination node increases, the routing information between the node and its destination nodes also increase; however, the link status information between the node and its neighbors may not change. Thus, in accordance with the present invention, the size of the link state information is to be kept small, and the broadcast cycle short due to the rapid changes of the neighbor nodes in the wireless network 100 so as to reduce the transmission overhead costs. On the other hand, in accordance with the present invention, the size of the routing information may be kept large, and the periodic broadcast to its minimum so as to avoid unnecessary broadcasting traffic.

In one embodiment of the present invention, a protocol message, such as a beacon, is utilized to reflect real time topology changes, and reduce overhead costs. In particular, according to the present invention, a broadcast cycle of the beacon is dynamically adjusted depending on the type of the beacon, such as a height beacon or a neighbor beacon, thereby reflecting real time topology changes and reducing overhead costs.

In one embodiment, the present invention may utilize a height beacon to broadcast height information, which may reflect changes in the node's position in relation to the destination. In another embodiment, the present invention may utilize a neighbor beacon to broadcast neighbor information, which may reflect changes between the node and its neighbor nodes. In yet another embodiment, the present invention may utilize a height beacon and a neighbor beacon to broadcast height and neighbor information, which may reflect changes in the topology.

In accordance with the present invention, the broadcast cycle of the beacons may be dynamically changed depending on a detailed message carried therein. In one embodiment of the present invention, the height beacon may be used to establish a route table. In the embodiment, the size of the detailed message carried in the height beacon may be relatively large. Since the height beacon may not need to be updated frequently in the height-based routing protocol utilized in the present invention, the broadcast cycle of the height beacon may be set longer. In another embodiment of the present invention, the neighbor beacon may be used to establish a neighbor routing table. Since the size of the detailed message carried in the neighbor beacon may be relatively small, the broadcast cycle of the neighbor beacon may be set shorter compared to that of the height beacon in accordance with the present invention.

Therefore, in the embodiment of the present invention, the two beacons, namely the height beacon and the neighbor beacon, may be broadcasted in different cycles depending on the detailed message carried therein so that the height beacon may be used to establish a route table while the neighbor beacon may be used to establish a neighbor route table. Due to the different broadcast cycles, the topology changes may be timely updated, while the broadcasting overhead is reduced.

Figure 3:
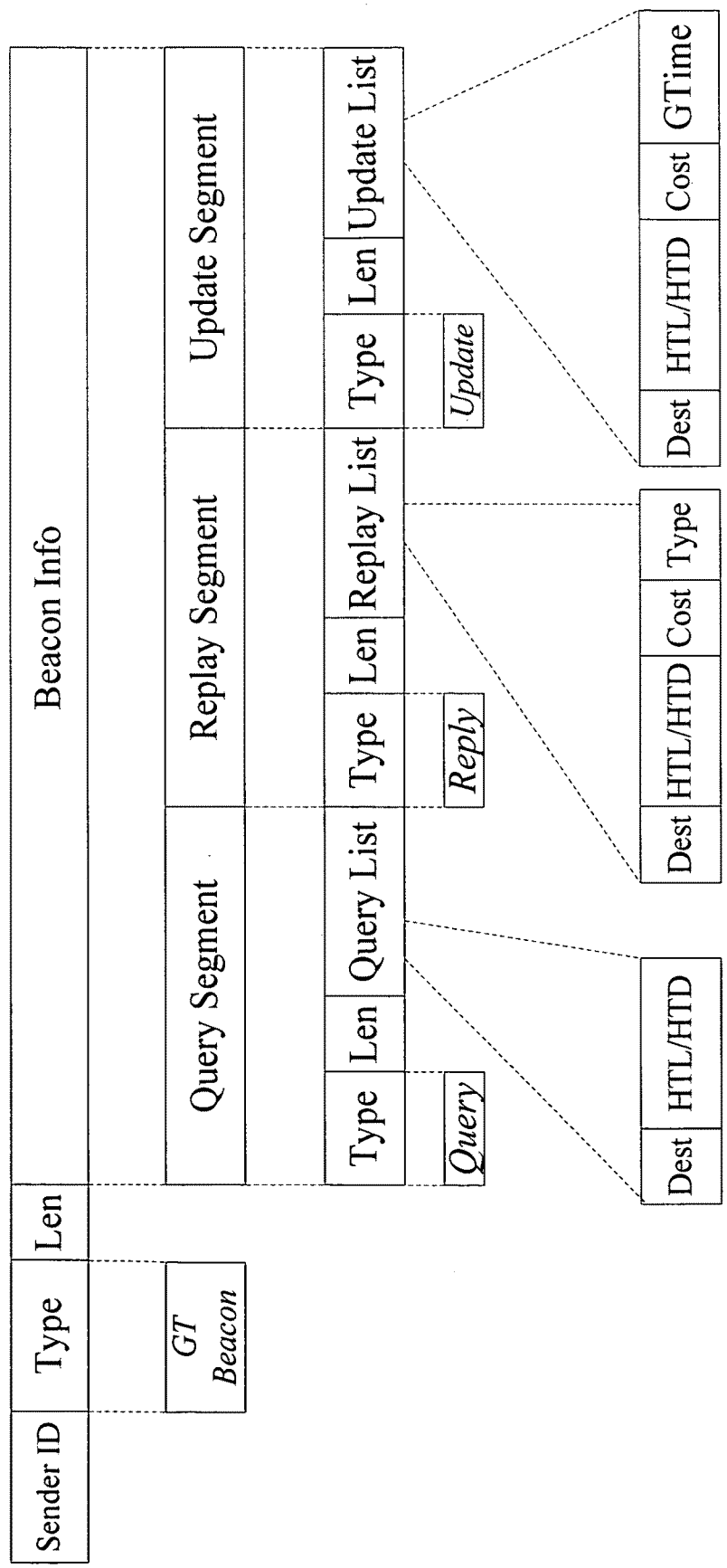
FIG. 3 is an exemplary packet of a height beacon in accordance with the present invention.
Figure 4:
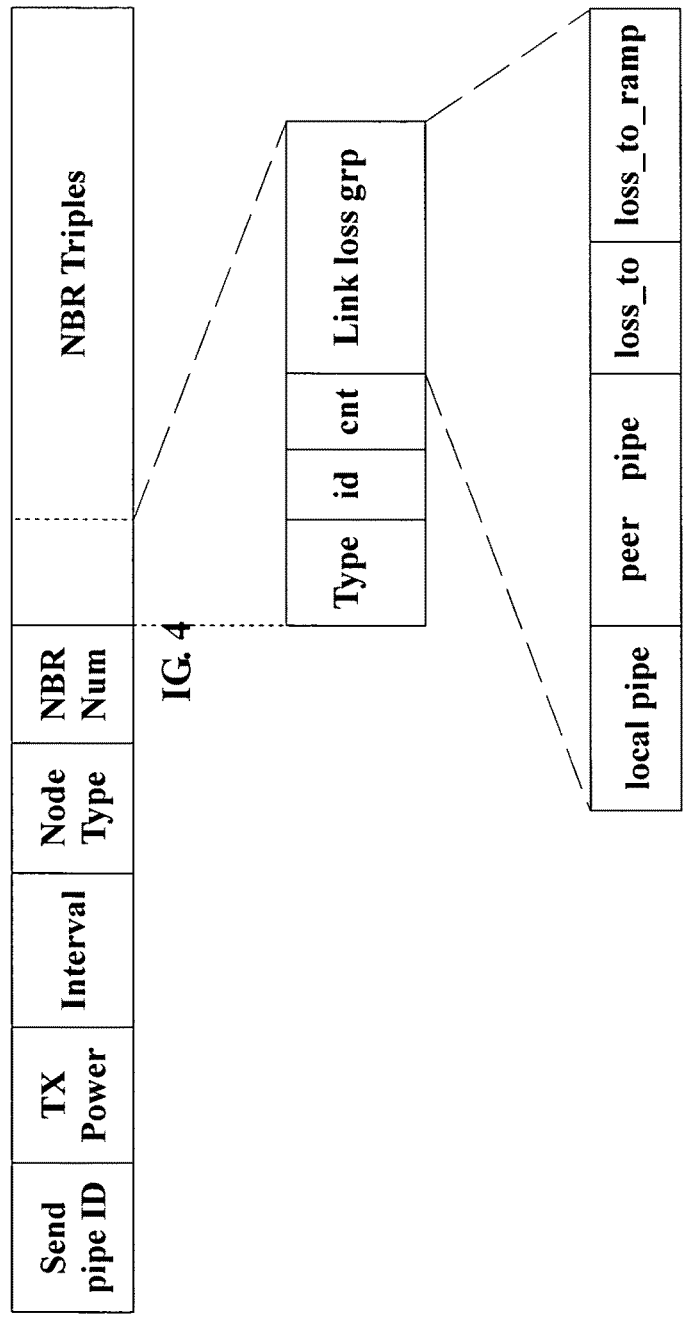
FIG. 4 is an exemplary packet of a neighbor beacon in accordance with the present invention.

Refer to FIGS. 3 and 4, which illustrate an exemplary packet for a height beacon and a neighbor beacon in accordance with the present invention, respectively. As shown in FIG. 3, in one embodiment of the present invention, a segment may be defined in the height beacon to identify the type of the beacon. The height beacon may be used to establish the route table, as described above.

Specifically, in one embodiment of the present invention, the height beacon may include three segments so as to carry detailed messages about the height beacon. As shown in FIG. 3, the height beacon of the present invention may include a query segment, a reply segment, and an update segment. In accordance with the present invention, the detailed message may be inserted in the corresponding segment and broadcasted in an appropriate cycle so as to reduce the number of empty messages broadcasted, thereby reducing the overhead costs.

For example, in one embodiment, the height beacon may carry a detailed message in the query segment. In another embodiment, the height beacon may carry a detailed message in the reply segment. In yet another embodiment, the height beacon may carry detailed messages in both the query and reply segments. In accordance with the present invention, the detailed messages carried in the query and reply segments may be small in size, and thus the height beacon may be adjusted to broadcast these detailed messages in shorter cycles. In yet another embodiment, the height beacon may carry a detailed message in the update segment. In accordance with the present invention, the detailed message contained in the update segment of the height beacon may be relatively larger in size, and thus the height beacon may be adjusted so as to broadcast the update message in longer cycles. In other words, the height beacon of the present invention may be broadcasted in an event driven manner. That is, when the height beacon carries detailed messages in the query and/or reply segment, the height beacon may be set to broadcast in shorter cycles. On the other hand, when the height beacon carries detailed messages in the update segment, the height beacon may be set to broadcast in longer cycles. As a result, the present invention may adjust the broadcast cycle of a protocol message, such as a beacon, according to the detailed message carried therein, thereby reducing unnecessary broadcast of the protocol message.

In one embodiment of the present invention, the detailed messages carried in the segments may be broadcasted in the same height beacon. In another embodiment of the present invention, the detailed messages carried in the segments may be broadcasted separately. In other words, the height beacon may carry the detailed messages in more than one segment in each broadcast cycle; or, the height beacon may carry the detailed message in one segment in each broadcast cycle.

In one embodiment of the present invention, a life cycle of a route may be categorized in five different status types. Thus, different detailed messages may be contained in the height beacon depending on the status of the life cycle. In one embodiment, the five status types may include "does no exist," "not ready," "pre-ready," "ready," and "dead." For example, when the status of the life cycle of the route is "not ready," the height beacon of the present invention may broadcast a query message in relatively short cycles. In another example, when the status is "pre-ready," the height beacon of the present invention may broadcast a reply message in relatively short cycles.

Refer to FIG. 4. In one embodiment of the present invention, the neighbor beacon may include channel ID, transmission power, interval, type of node, neighbor node no., and neighbor node triples, etc. In one embodiment of the present invention, the neighbor beacon received may be used to establish a relationship for the links between the neighbor nodes. Broadcasting the neighbor nodes may include broadcasting information about special neighbors and/or information other than the special neighbors. The broadcast cycle may also be adjusted with configurable parameters.

In accordance with the present invention, the neighbor beacon may request the broadcast cycle as well as the type of messages that carry neighbor information. The neighbor nodes may select a given number of neighbors as close neighbors. The selection may utilize the conventional method for selecting close neighbors. Close neighbors may also select the best neighbor identified by the current height.

Since the purpose of route selection is to reasonably reduce the transmission time, and increase the utilization of wireless network resources, the present invention further introduces the concept of cost to dynamically adjust the broadcast cycle of the protocol message. In one embodiment of the present invention, the value of cost may be defined as a time value needed from a source node, such as source node 102, to a destination node, such as destination node 104. The time value may be affected by wireless connection status, network traffic, packet size, data transmission rate, or any combination thereof.

In accordance with the present invention, the cost value may be recorded in the route table as well as the neighbor route table. For example, the neighbor route table may record the cost vale between the node and the neighbor node, while the route table may record the cost value between the node and the destination node.

Furthermore, the present invention introduces an additional parameter to adaptively adjust the cost value. That is, the cost value is calculated by a weighted average of the original cost value and a new cost value. In one embodiment, the adaptive cost value may be calculated by using the following equation:

$$\text{Cost}=\text{Old\_Cost}+A*\text{New Cost, where } 0<A<1, \text{ and } A \text{ is a configurable parameter.}$$

In accordance with the present invention, the protocol message, such as the height beacon and the neighbor beacon, may be broadcasted in different cycles depending on the detailed message carried therein, thereby updating the height table and neighbor table accordingly.

Figure 5:
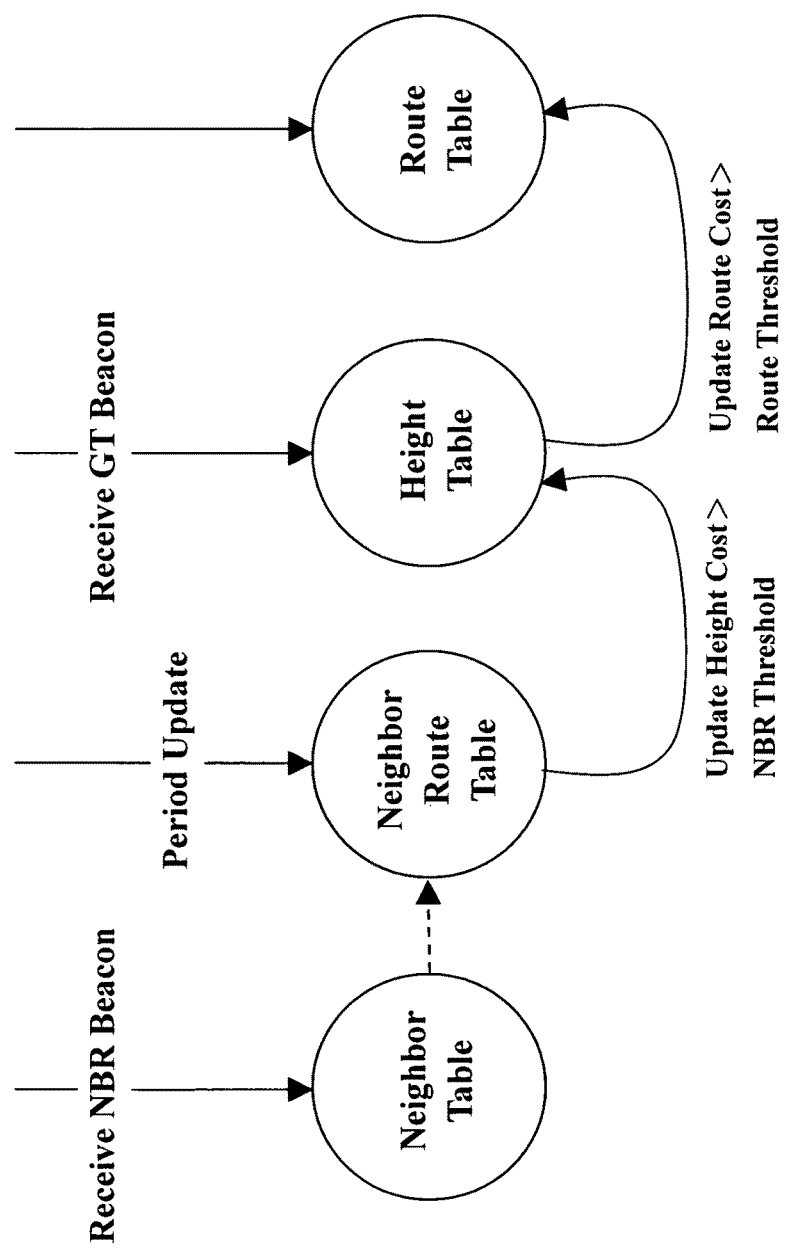
FIG. 5 is a series of steps that may be caused after a neighbor beacon is received in one embodiment of the present invention.

Refer to FIG. 5, which illustrates a series of steps that may be caused after the neighbor beacon is received in accordance with the present invention. As shown in FIG. 5, in one embodiment of the present invention, when the neighbor beacon is received, it may first trigger a change to the neighbor table. According to the change to the neighbor table, the neighbor rout table may look up the cost value in each link during the periodic update so as to update its own route table. In accordance with the present invention, a neighbor may also be selected from the neighbor table for local routing according to the routing status.

Furthermore, in one embodiment of the present invention, if the change of the cost value exceeds a certain threshold, the cost value of the height may be affected. Since the height is selected from all the selectable height messages, and these height messages are selected for routing data according to a particular principle, such as a best-cost principle, if the change of the cost of the height exceeds a certain number, the final route selection may be affected. In one embodiment, the threshold may be configured manually. In another embodiment, the threshold may be configured automatically.

In one embodiment of the present invention, when the change of the cost in the link does not exceed the threshold to switch to a different link, the link may not be switched. In another embodiment of the present invention, when the change of the cost in the neighbor node does not exceed the threshold to switch to a different route, the neighbor node may not be switched.

In accordance with the present invention, at the link level, a ramp value may be calculated based on the cycle time provided by the neighbor beacon so as to expire the link. In accordance with the present invention, the ramp value records the number of packet loss during a broadcast cycle of the neighbor node. When the number of packet loss exceeds a predetermined value, the link is deemed non-operational.

Figure 6:
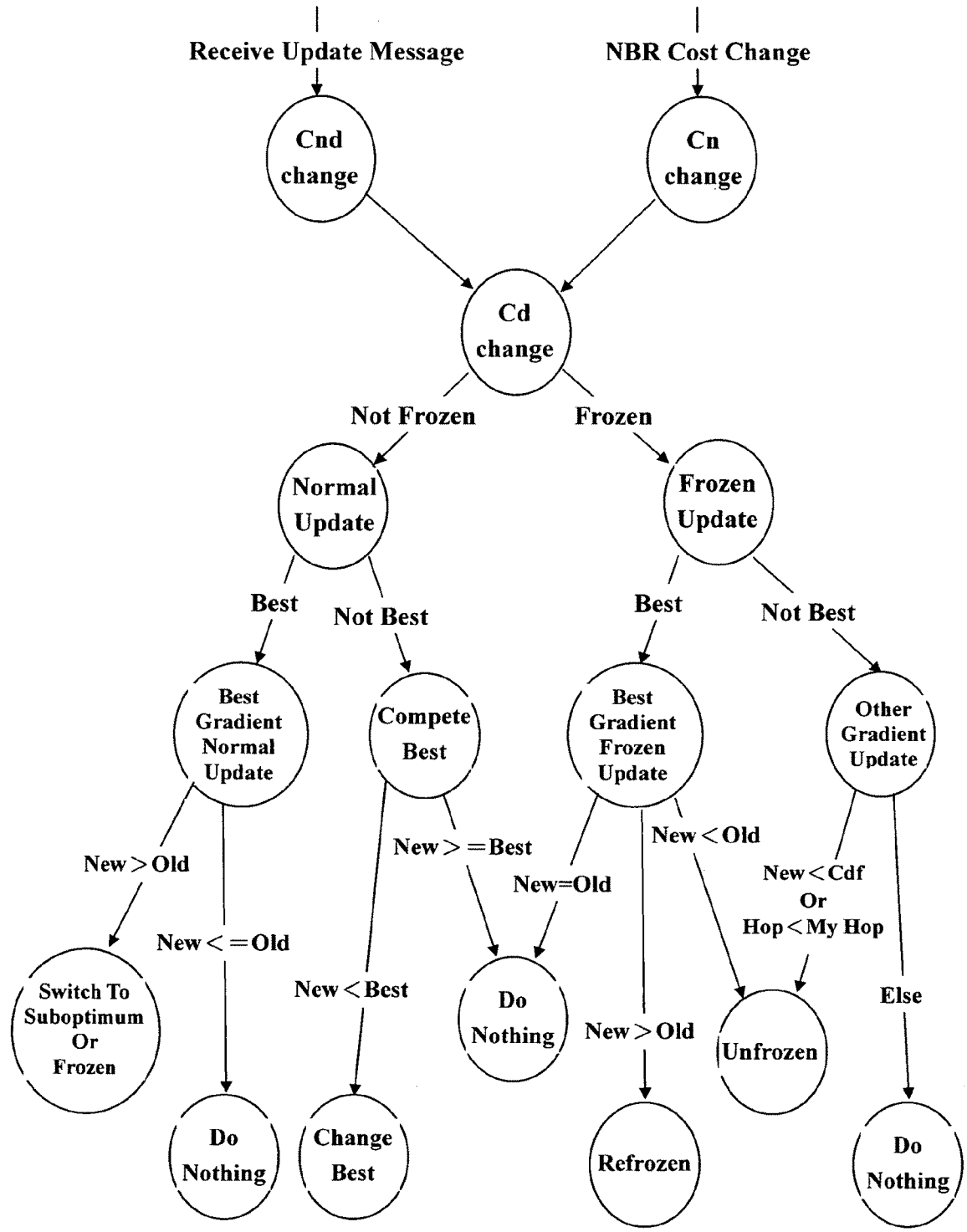
FIG. 6 is a flow chart showing an update process updating network information after a height beacon is received in an embodiment of the present invention.
Figure 7:
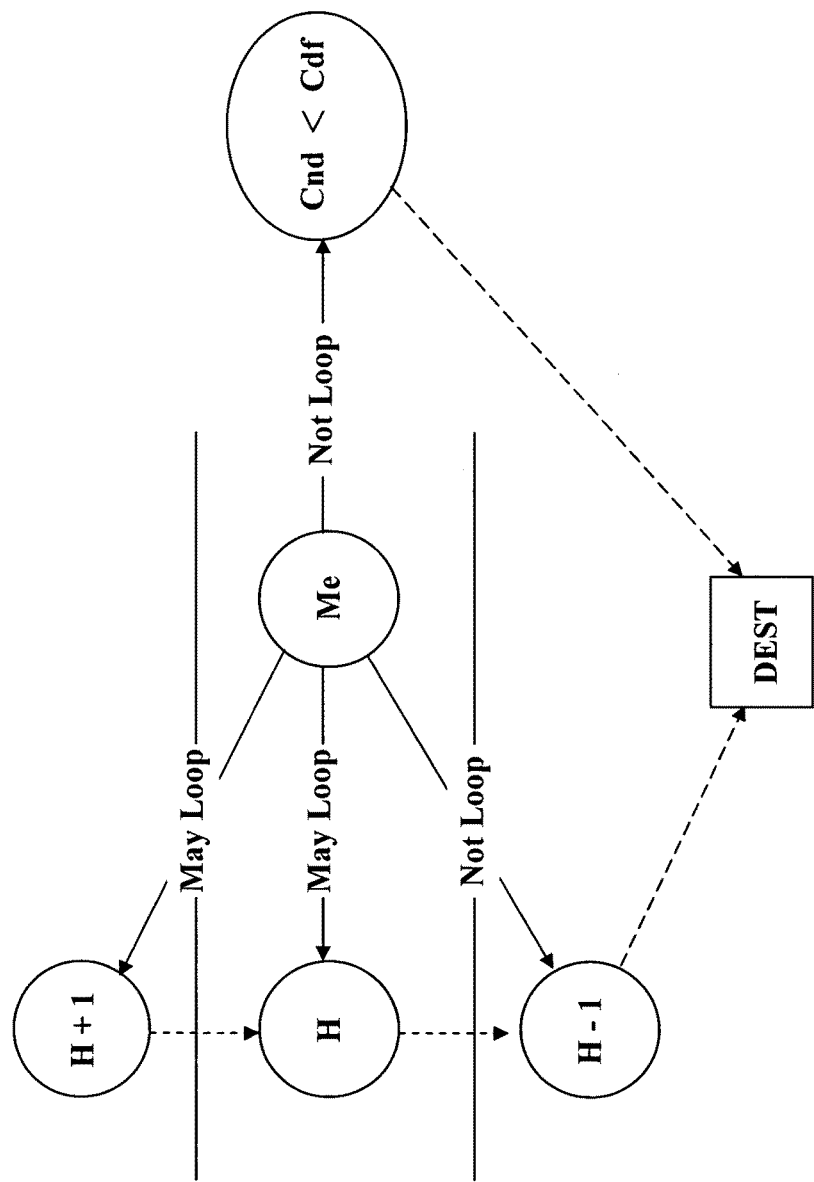
FIG. 7 is a flow chart showing whether to proceed with a freeze step in an embodiment of the present invention.

Refer to FIGS. 6 and 7, which illustrate a flow chart showing an update process updating network information after a height beacon is received and a flow chart showing whether to proceed with a freeze step in accordance with the present invention, respectively. In one embodiment of the present invention, when an update message contained in the height beacon is received, such as a neighbor cost to destination, Cnd, or when the change of the cost of the corresponding neighbor node, such as cost to neighbor, Cn, exceeds a threshold for the routing cost, an entry of the cost value in the route table, such as cost to destination, Cd, may change, thereby activating a switch or a freeze mechanism for the route.

In accordance with the present invention, a routing loop needs to be prevented when establishing the height. The routing loop may occur when the cost of a link suddenly changes due to an external factor, and such change cannot be notified to other nodes due to the short timing. As the original route passing through the old nodes is chosen based on the best route principle, it results in a loop. In a normal situation, only when the best cost chosen increases, will the occurrence of the loop be possible. As shown in FIG. 6, the present invention prevents the looping problem through a freeze mechanism. In one embodiment of the present invention, if a route selected may not result in a loop, then it is not necessary to set the route to a frozen status.

As shown in FIG. 7, when the cost of the best height increases, it is possible to form a loop. Therefore, it is necessary to determine whether the freeze mechanism should take place. If there exists a sub-optimum height, then it is not necessary to activate the freeze mechanism, and the route may be switched to the sub-optimum height directly.

In one embodiment of the present invention, the sub-optimum can be chosen based on any one of the following conditions:

The Cnd of the other node is smaller than the Cd of the node prior to frozen.

The position of the other node in the height is lower than the node itself (Hop<My Hop).

In one embodiment of the present invention, the Cdf may need to be recorded before frozen so as to be used in testing for an unfrozen condition.

As mentioned above, the purpose of the height-based routing is to establish the height to the destination that is dynamically changed. In order to reduce the overhead costs and reflect real time changes in topology, of all the heights adopted in the present invention, only a portion of the heights may be converted into useful heights. In accordance with the present invention, these heights may form into a certain shape, such as an oval shape. Limiting the shape may further reduce partial effect of the heights to the network as a whole.

Figure 8:
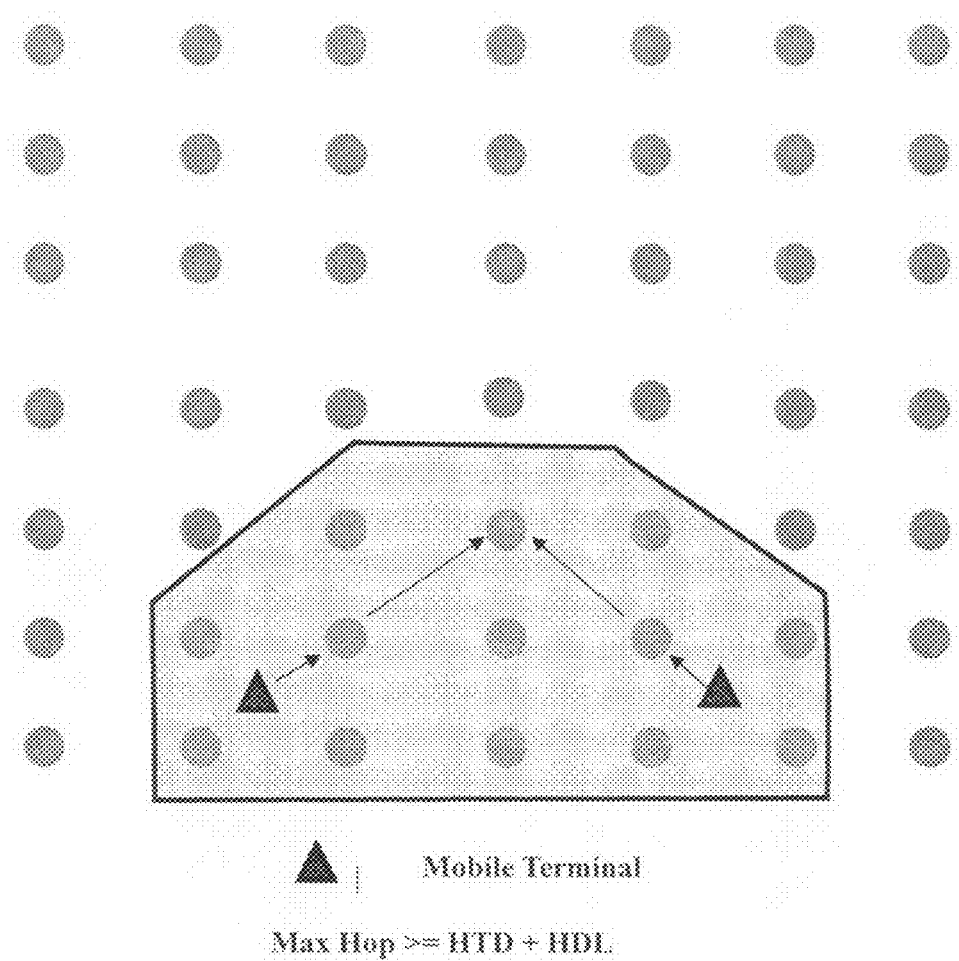
FIG. 8 is a schematic drawing showing an effect caused by limiting the heights in the height-based routing in accordance with one embodiment of the present invention.

FIG. 8 illustrates a schematic view of the effect caused by the limiting the heights in the height-based routing in accordance with one embodiment of the present invention. As shown in FIG. 8, by setting the relationship between the Hop to Live (HTL) and the Hop to Destination (HTD), for example HTD+HTL<=Max hop, the effect of the on-demand height may be limited. For example, in one embodiment of the present invention, the area having the heights satisfying the above condition may be formed into a trapezoid shape, which becomes the selectable area, as shown. Heights outside of the area are not considered. However, the area having the heights satisfying the above condition may be formed into an oval shape or any other shape. As a result, useless routing messages may be reduced, and thus reducing the network overhead and reflecting real time changes in the topology.

While the invention has been described in conjunction with exemplary preferred embodiments, it is to be understood that many alternatives, modifications, and variations will be apparent to those skilled in the art in light of the foregoing description. Accordingly, it is intended to embrace all such alternatives, modifications, and variations that fall within the scope of the included claims. The scope of the claims, therefore, should be accorded the broadest interpretation so as to encompass all such modifications and similar arrangements. All matters set forth herein or shown in the accompanying drawings are to be interpreted in an illustrative and non-limiting sense.

What is claimed is:

1. A wireless communication method of supporting rapid changes in a network topology, said method comprising:

broadcasting a first protocol message with a first broadcast cycle, said first protocol message being used for establishing a routing information between a node and a destination node; and broadcasting a second protocol message with a second broadcast cycle, said second protocol message being used for establishing a link information between said node and a neighbor node, wherein said first broadcast cycle is different from said second broadcast cycle, and said first broadcast cycle is dynamically adjusted depending on a corresponding detailed message contained in a plurality of segments in said first protocol message so as to reduce a number of broadcast of said first protocol message, wherein said corresponding detailed message includes a query message, a reply message, an update message, or any combination thereof; and wherein said query message and said reply message are broadcasted in a cycle shorter than a cycle for broadcasting said update message.

2. The communication method of claim 1, further comprising utilizing a cost value to determine whether to adjust said first broadcast cycle and said second broadcast cycle, wherein said cost value is calculated with a time parameter, and wherein said cost value of said first protocol message is said time parameter from said node to said destination node, and said cost value of said second protocol message is said time parameter from said node to said neighbor node.

3. The communication method of claim 2, wherein said cost value is calculated by the following equation: a cost value=a current cost value+a configurable parameter*a new cost value, wherein said configurable parameter is a value between 0 and 1.

4. The communication method of claim 2, wherein said time parameter is based on a wireless connection status, a network traffic, a packet size, a data transmission rate, or any combination thereof.

5. The communication method of claim 2, further comprising manually setting a threshold so that when a change in said cost value exceeds said threshold, said first broadcast cycle and said second broadcast cycle are adjusted.

6. The communication method of claim 2, further comprising determining whether to perform a freeze step or a switch step depending on said cost value so as to avoid a loop.

7. The communication method of claim 6, wherein if a sub-optimum height exists, then perform said switch step, or else, perform said freeze step.

8. The communication method of claim 2, further comprising recording said cost value of said first protocol message and said cost value of said second protocol message in said routing information and said link information, respectively.

9. The communication method of claim 1, further comprising setting a maximum hop so as to limit an area of neighbor nodes.

10. The communication method of claim 9, wherein said maximum hop is smaller than a sum of a hop to a source and a hop to a destination.

11. The communication method of claim 1, further comprising dynamically adjusting said second broadcast cycle depending on a corresponding detailed message contained in said second protocol message so as to reduce a number of broadcast of said second protocol message.

12. The communication method of claim 1, wherein said second protocol message includes a neighbor message.

13. The communication method of claim 1, further comprising calculating a ramp value based on a cycle time provided by said second protocol message, said ramp value recording a number of packets lost in said second broadcast cycle, wherein when said ramp value exceeds a predetermined value, a link is considered not operational.

14. The communication method of claim 1, wherein said first protocol message is a height beacon.

15. The communication method of claim 1, wherein said second protocol message is a neighbor beacon.

16. The communication method of claim 1, wherein said first protocol message is broadcasted in an event-driven manner.

17. The communication method of claim 1, wherein said routing information is a route table, and said link information is a neighbor route table.

18. The communication method of claim 1, further comprising broadcasting different detailed messages depending on a status of a life cycle of a route.

* * * * *